US012811221B2

(12) United States Patent
Jang et al.

(10) Patent No.: US 12,811,221 B2
(45) Date of Patent: Nov. 24, 2026

(54) BATTERY MODULE AND BATTERY PACK WITH IMPROVED SAFETY

(71) Applicant: LG ENERGY SOLUTION, LTD., Seoul (KR)

(72) Inventors: Sung-Hwan Jang, Daejeon (KR); Jun-Yeob Seong, Daejeon (KR); Myung-Ki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 619 days.

(21) Appl. No.: 18/277,878

(22) PCT Filed: Oct. 31, 2022

(86) PCT No.: PCT/KR2022/016850
§ 371 (c)(1),
(2) Date: Aug. 18, 2023

(87) PCT Pub. No.: WO2023/080581
PCT Pub. Date: May 11, 2023

(65) Prior Publication Data

US 2024/0128556 A1 Apr. 18, 2024

(30) Foreign Application Priority Data

Nov. 3, 2021 (KR) ........................ 10-2021-0150114

(51) Int. Cl.
*H01M 50/383* (2021.01)
*H01M 10/659* (2014.01)
(Continued)

(52) U.S. Cl.
CPC ....... *H01M 50/143* (2021.01); *H01M 10/659* (2015.04); *H01M 50/209* (2021.01);
(Continued)

(58) Field of Classification Search
CPC ............. H01M 50/143; H01M 50/249; H01M 50/209; H01M 50/375; H01M 10/659; H01M 2220/20
See application file for complete search history.

(56) References Cited

U.S. PATENT DOCUMENTS

2010/0075213 A1 3/2010 Mehta et al.
2011/0274951 A1 11/2011 Yasui et al.
(Continued)

FOREIGN PATENT DOCUMENTS

CN 107112609 A 8/2017
CN 208078043 U 11/2018
(Continued)

OTHER PUBLICATIONS

JP2018098074A. Jun. 21, 2018. English machine translation by EPO. (Year: 2018).*
(Continued)

*Primary Examiner* — James Lee
(74) *Attorney, Agent, or Firm* — Birch, Stewart, Kolasch & Birch, LLP

(57) ABSTRACT

A battery module has an improved structure to improve safety when a thermal event occurs in the battery module. A battery module includes a cell assembly including one or more battery cells, a module case having an inner space in which the cell assembly is accommodated, and an expansion member located in the module case, and configured to fill at least a part of an empty space in the module case by being expanded in volume when heat is supplied.

16 Claims, 17 Drawing Sheets

(51) Int. Cl.
*H01M 50/143* (2021.01)
*H01M 50/209* (2021.01)
*H01M 50/249* (2021.01)
*H01M 50/375* (2021.01)
*H01M 50/489* (2021.01)

(52) U.S. Cl.
CPC ....... *H01M 50/249* (2021.01); *H01M 50/375* (2021.01); *H01M 2220/20* (2013.01)

(56) References Cited

U.S. PATENT DOCUMENTS

| | | | | |
|---|---|---|---|---|
| 2012/0003526 | A1* | 1/2012 | Kume | H01M 10/0481 429/151 |
| 2014/0170447 | A1 | 6/2014 | Woehrle et al. | |
| 2015/0056482 | A1 | 2/2015 | Kyla-Kalla et al. | |
| 2019/0131676 | A1 | 5/2019 | Koga | |
| 2020/0287252 | A1 | 9/2020 | Li et al. | |
| 2021/0083344 | A1 | 3/2021 | Min | |
| 2021/0320374 | A1 | 10/2021 | Lee et al. | |
| 2022/0271387 | A1 | 8/2022 | Shin et al. | |
| 2022/0393296 | A1 | 12/2022 | Namgoung et al. | |
| 2022/0407175 | A1 | 12/2022 | Miyata et al. | |
| 2023/0006275 | A1 | 1/2023 | Shin et al. | |
| 2023/0087017 | A1* | 3/2023 | Xiao | H01M 50/394 429/120 |

FOREIGN PATENT DOCUMENTS

| | | | |
|---|---|---|---|
| CN | 112107817 | A | 12/2020 |
| CN | 112896893 | A | 6/2021 |
| JP | 2011-23355 | A | 2/2011 |
| JP | 2013-178966 | A | 9/2013 |
| JP | 2017-182898 | A | 10/2017 |
| JP | 2018-37181 | A | 3/2018 |
| JP | 2018-98074 | A | 6/2018 |
| JP | 2019-83188 | A | 5/2019 |
| JP | 2021-517708 | A | 7/2021 |
| KR | 10-2014-0005323 | A | 1/2014 |
| KR | 10-2015-0003779 | A | 1/2015 |
| KR | 10-2018-0133105 | A | 12/2018 |
| KR | 10-2019-0082974 | A | 7/2019 |
| KR | 10-2020-0107213 | A | 9/2020 |
| KR | 10-2020-0113500 | A | 10/2020 |
| KR | 10-2254205 | B1 | 5/2021 |
| KR | 10-2021-0063939 | A | 6/2021 |
| KR | 10-2021-0077971 | A | 6/2021 |
| KR | 10-2021-0109315 | A | 9/2021 |
| WO | WO 2010/098067 | A1 | 9/2010 |
| WO | WO 2021/100813 | A1 | 5/2021 |

OTHER PUBLICATIONS

International Search Report (PCT/ISA/210) issued in PCT/KR2022/016850, dated Mar. 2, 2023.

* cited by examiner

BATTERY MODULE AND BATTERY PACK WITH IMPROVED SAFETY

TECHNICAL FIELD

The present application claims priority to Korean Patent Application No. 10-2021-0150114 filed on Nov. 3, 2021 in the Republic of Korea, the disclosures of which are incorporated herein by reference.

The present disclosure relates to a battery, and more particularly, to a battery module and a battery pack with improved safety and a vehicle including the battery module and the battery pack.

BACKGROUND ART

As the demand for portable electronic products such as laptops, video cameras, and mobile phones has recently rapidly increased and the commercialization of robots, electric vehicles, etc. has begun in earnest, research on high-performance secondary batteries capable of repeated charging/discharging has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus, have advantages of free charge/discharge, very low self-discharge rate, and high energy density.

A lithium secondary battery mainly uses a lithium-based oxide and a carbon material as a positive electrode active material and a negative electrode active material, respectively. A lithium secondary battery includes an electrode assembly in which a positive electrode plate and a negative electrode plate coated with a positive electrode active material and a negative electrode active material are located with a separator therebetween, and a casing in which the electrode assembly is air-tightly accommodated with an electrolyte, that is, a battery case.

In general, according to a shape of a casing, lithium secondary batteries may be classified into can-type secondary batteries in which an electrode assembly is received in a metal can, and pouch-type secondary batteries in which an electrode assembly is received in a pouch of an aluminum laminate sheet.

Recently, secondary batteries have been widely used for driving or energy storage not only in small devices such as portable electronic devices but also in medium and large-sized devices such as electric vehicles and energy storage systems (ESSs). A plurality of secondary batteries may be electrically connected to each other and accommodated together in a module case to constitute one battery module. A plurality of battery modules may be connected to each other to constitute one battery pack.

However, when a plurality of secondary batteries (battery cells) or a plurality of battery modules are densely arranged in a narrow space, they may be vulnerable to a thermal event. In particular, when an event such as thermal runaway occurs in a battery module, high-temperature gas, flame, or heat may be generated. When the gas, flame, or heat is not appropriately controlled, a fire or explosion may occur in the battery module, and a fire or explosion may also occur in other battery modules. Also, a medium or large-sized battery pack, for example, a battery pack for an electric vehicle, may include a large number of battery cells and battery modules to increase a capacity and/or output. Furthermore, in the case of a battery pack mounted on an electric vehicle or the like, there may be a person such as a driver around the battery pack. Accordingly, when a thermal event occurring in a specific battery module is not appropriately controlled and a chain reaction such as thermal propagation occurs, large property damage as well as loss of life may be caused.

DISCLOSURE

Technical Problem

The present disclosure is designed to solve the problems of the related art, and therefore the present disclosure is directed to providing a battery module with an improved structure to improve safety when a thermal event occurs in the battery module, and a battery pack and a vehicle including the battery module.

However, the technical purpose to be solved by the present disclosure is not limited to the above, and other objects not mentioned herein will be clearly understood by one of ordinary skill in the art from the following disclosure.

Technical Solution

In one aspect of the present disclosure, there is provided a battery module including a cell assembly including one or more battery cells, a module case having an inner space in which the cell assembly is accommodated, and at least one expansion member located in the module case, and configured to fill at least a part of an empty space in the module case by being expanded in volume when heat is supplied.

The at least one expansion member may include a phase-change material.

Also, the battery module may further include a fire extinguishing member containing a fire extinguishing material, and configured to release the fire extinguishing material therein when the at least one expansion member is expanded.

Also, the at least one expansion member may be located between the cell assembly and the fire extinguishing member.

Also, the fire extinguishing member may be located over the cell assembly.

Also, a venting hole may be formed in the module case, wherein the at least one expansion member is configured to close at least a part of the venting hole when being expanded.

Also, the at least one expansion member may have a plurality of expansion portions, and a degree of expansion of the plurality of expansion portions of the at least one expansion member may be different.

Also, the plurality of expansion portions may have different reaction temperatures for expansion.

In another aspect of the present disclosure, there is also provided a battery pack including the battery module according to the present disclosure.

According to another aspect of the present disclosure, there is provided a battery pack including a cell assembly including one or more battery cells, a pack case having an inner space in which the cell assembly is accommodated, and an expansion member located in the pack case, and configured to fill at least a part of an empty space in the pack case by being expanded in volume when heat is supplied.

According to another aspect of the present disclosure, there is provided a vehicle including the battery module or the battery pack according to the present disclosure.

The at least one expansion member may have apertures.

The cell assembly may be two groups of battery cells, and the at least one expansion member may be between the two groups of battery cells.

The at least one expansion member may be a first expansion member and a second expansion member, and a fire extinguishing member containing a fire extinguishing material may be between the first expansion member and the second expansion member.

The at least one expansion member may be a first expansion member between the cell assembly and a first wall of the module case, a second expansion member between the cell assembly and a second wall of the module case and a third expansion member between the two groups of battery cells.

The one or more battery cells are stacked in a first direction of the module case, and concave grooves are formed across a bottom wall of the module case in the first direction.

Advantageous Effects

According to the present disclosure, even when a thermal event occurs in a battery module, safety against the thermal event may be improved.

In particular, according to an aspect of the present disclosure, when a thermal event occurs in a battery module, an empty space may be filled to suppress a fire.

Furthermore, according to an embodiment of the present disclosure, because introduction of external oxygen is prevented or suppressed, a fire may be prevented.

Also, according to an embodiment of the present disclosure, because leakage of a flame or the like is prevented, propagation of thermal runaway or fire to other battery modules may be prevented.

The present disclosure may have various other effects, which will be described in each embodiment, or descriptions of effects that may be easily inferred by one of ordinary skill in the art will be omitted.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
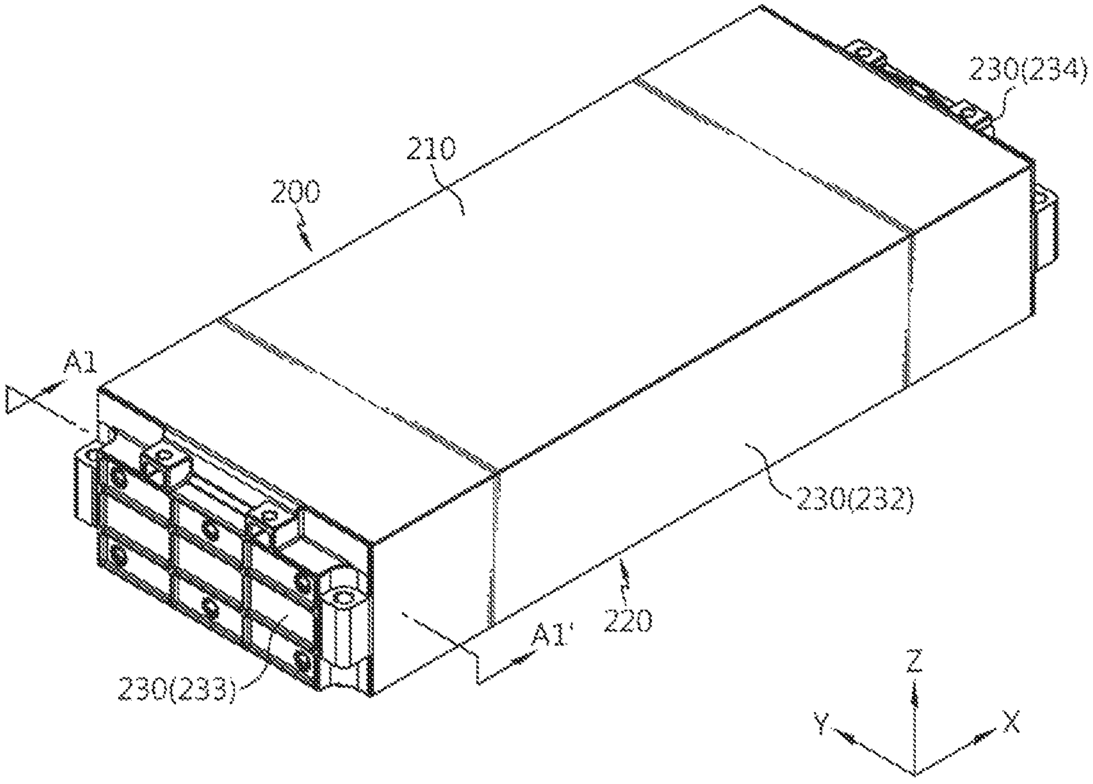
FIG. 1 is a combined perspective view schematically illustrating elements of a battery module, according to an embodiment of the present disclosure.
Figure 2:
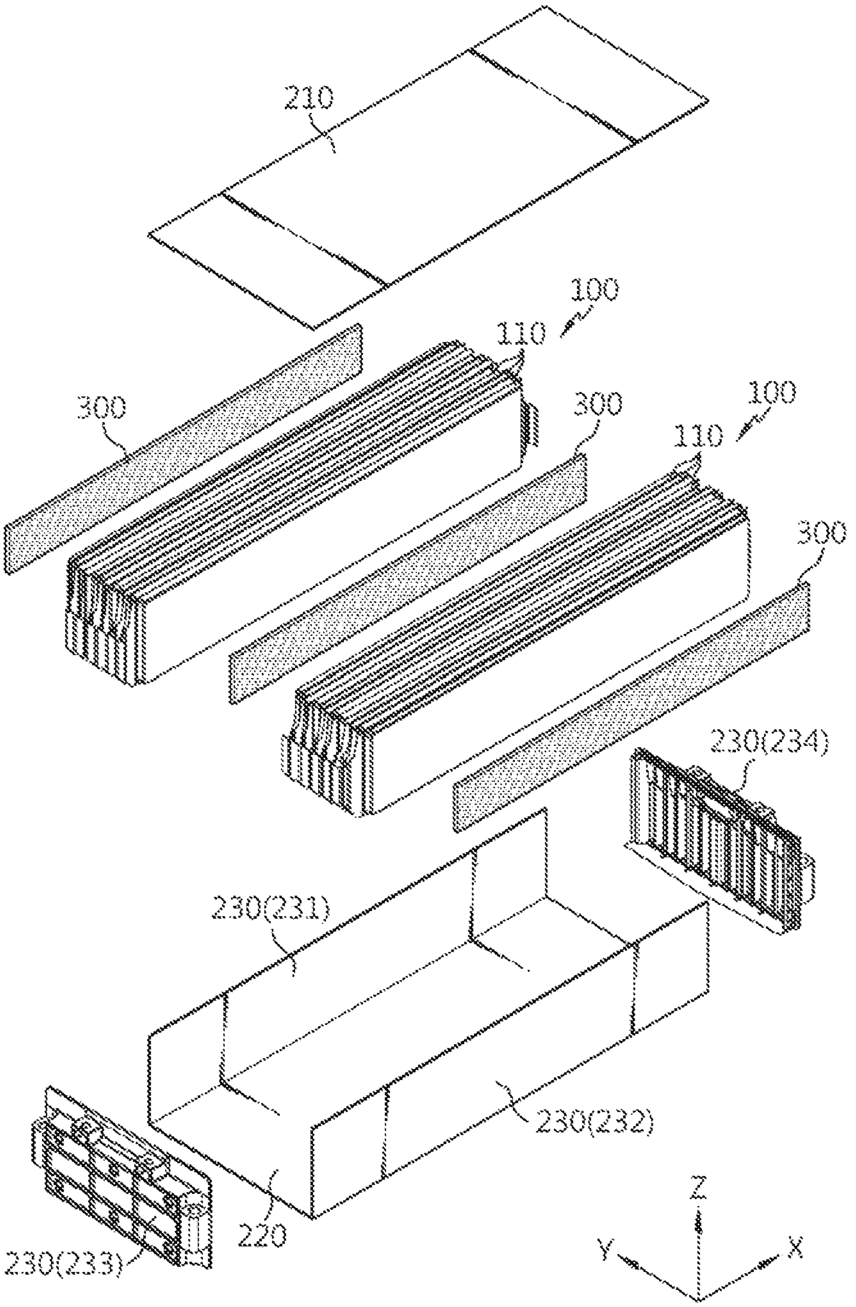
FIG. 2 is an exploded perspective view illustrating the battery module of FIG. 1.
Figure 3:
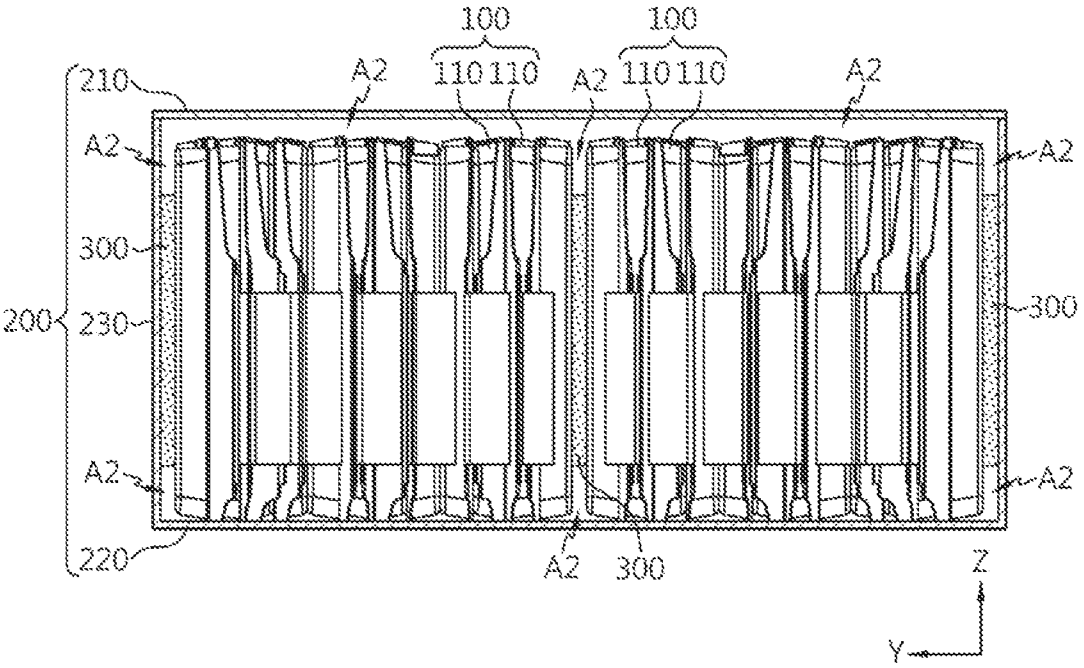
FIG. 3 is a cross-sectional view taken along line A1-A1' of FIG. 1.

FIG. 1 is a combined perspective view schematically illustrating elements of a battery module, according to an embodiment of the present disclosure. FIG. 2 is an exploded perspective view illustrating the battery module of FIG. 1. FIG. 3 is a cross-sectional view taken along line A1-A1' of FIG. 1.

Referring to FIGS. 1 to 3, a battery module according to the present disclosure includes a cell assembly 100, a module case 200, and an expansion member 300.

The cell assembly 100 may include one or more battery cells 110. Each battery cell 110 may refer to a secondary battery. The secondary battery may include an electrode assembly, an electrolyte, and a battery case. In particular, the battery cell 110 provided in the cell assembly 100 may be a pouch-type secondary battery. However, another type of secondary battery, for example, a cylindrical battery or a prismatic battery, may be applied to the cell assembly 100.

A plurality of secondary batteries may be stacked on each other to form the cell assembly 100. For example, the plurality of secondary batteries may be stacked by being arranged in parallel in a horizontal direction (Y axis direction) while erected in a vertical direction (Z axis direction). Each battery cell 110 may include an electrode lead, and the electrode lead may be located at both ends or at one end of the battery cell 110. A secondary battery in which an electrode lead protrudes in both directions may be referred to as a bidirectional cell, and a secondary battery in which an electrode lead protrudes in one direction may be referred to as a unidirectional cell. However, the present disclosure is not limited to a specific type or shape of a secondary battery, and various types of secondary batteries known at the time of filing the present application may be applied to the cell assembly 100.

The module case 200 may include a top plate 210, a base plate 220, and a side plate 230, as shown in FIG. 2. An inner space of the module case 200 may be defined by these elements, that is, the top plate 210, the base plate 220, and the side plate 230. The top plate 210 may be located in an upper portion of the module case 200, and the base plate 220 may be spaced apart from the bottom of the top plate 210 by a certain distance. Also, the side plate 230 may be located between the top plate 210 and the base plate 220 so that an upper end and a lower end are respectively connected to the top plate 210 and the base plate 220.

The top plate 210, the base plate 220, and/or the side plate 230 may be formed in a thin sheet shape, that is, a plate shape, but may be formed in a polyhedral shape having a thickness of a certain level or more, for example, a rectangular parallelepiped shape. Furthermore, the side plate 230 may include a left plate 231, a right plate 232, a front plate 233, and a rear plate 234. All or some of the top plate 210, the base plate 220, and/or the side plate 230 may be formed of a metal material. Also, at least some of them may be formed of a plastic material. For example, the left plate 231, the right plate 232, the top plate 210, and the base plate 220 may be formed of a steel material. The front plate 233 and the rear plate 234 may be formed of a plastic material.

At least some of the top plate 210, the base plate 220, and the side plate 230 may be integrally formed with each other. For example, as shown in FIG. 2, the left plate 231 and the right plate 232 from among four side plates 230 may be integrally formed with the base plate 220. In this case, the left plate 231, the right plate 232, and the base plate 220 which are integrally formed with each other may be referred to as a U-frame due to their shape. In this case, the front plate 233 and the rear plate 234 that are end plates may be respectively coupled to opening portions of a front end and a rear end of the U-frame. The top plate 210 may be coupled to an opening portion of an upper end of the U-frame.

However, the module case 200 may be configured in any of various other shapes. For example, the base plate 220 and the four side plates 230 may be integrally formed to constitute a lower case having a box shape. In this case, the top plate 210 may be coupled to an opening portion of an upper end of the lower case having the box shape. In another example, the base plate 220, the left plate 231, the right plate 232, and the top plate 210 may be integrally formed to constitute a case having a pipe shape. In this case, the case having the pipe shape may be referred to as a mono frame.

Various coupling methods may be applied to a configuration in which the top plate 210, the base plate 220, the left plate 231, the right plate 232, the front plate 233, and the rear plate 234 are not integrally manufactured but are coupled in an assembly process of the battery module. For example, the top late 210, the front plate 233, and the rear plate 234 may be coupled to the U-frame by using laser welding or ultrasonic welding. Alternatively, elements of the module case 200 may be coupled to each other by using bolt fastening.

An inner space of the module case 200 may be defined by the top plate 210, the base plate 220, and the side plate 230, and the cell assembly 100 is accommodated in the inner space.

The expansion member 300 may be located in the module case 200. Moreover, one or more expansion members 300 may be included in the module case 200. The expansion member 300 may be configured to be expanded in volume when heat is supplied. In particular, the expansion member 300 may include a material whose volume increases when heat is supplied to reach a certain temperature or higher. Due to this volume expansion, the expansion member 300 may fill at least a part of an empty space in the module case 200. Such a volume expansion configuration will be described in more detail with further reference to FIG. 4.

Figure 4:
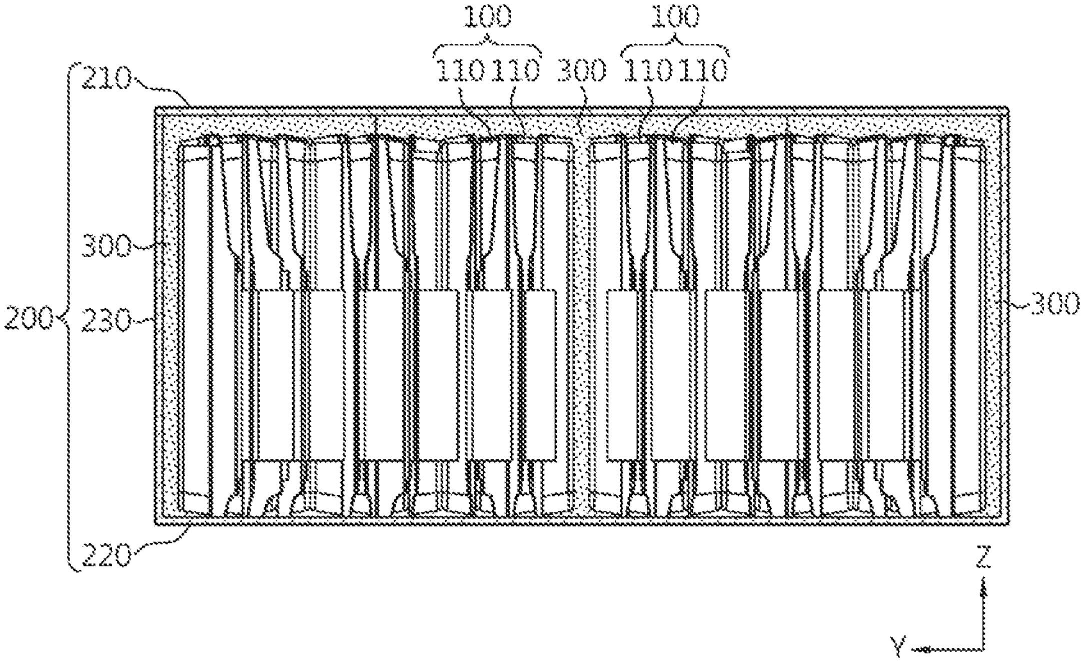
FIG. 4 is a cross-sectional view schematically illustrating a state where an expansion member is expanded by heat, in a configuration of FIG. 3.

FIG. 4 is a cross-sectional view schematically illustrating a state where the expansion member 300 is expanded by heat, in a configuration of FIG. 3.

Referring to FIGS. 3 and 4 together, the expansion member 300 may be expanded by heat to fill an empty space in the module case 200. First, as shown in FIG. 3, the cell assembly 100 and the expansion member 300 may be accommodated in an inner space of the module case 200. In this case, the cell assembly 100 and the expansion member 300 may occupy a part of the inner space of the module case 200, and a space not occupied by the cell assembly 100 and the expansion member 300 may be left as an empty space. In particular, in a normal battery module state, for example, in a state where thermal runaway does not occur in the battery module, there may be an empty space in the module case 200.

For example, there may be an empty space A2 between an upper portion of the cell assembly 100 and a bottom surface of the top late 210 and between a side portion of the cell assembly 100 and the side plate 230, as shown in FIG. 3. Moreover, the expansion member 300 may be located between the side portion of the cell assembly 100 and the side plate 230, and a height of the expansion member 300 may be lower than a height of the cell assembly 100. The expansion member 300 may be located at a central portion of a side surface of the cell assembly 100 in the vertical direction. In this case, there may be an empty space over and under the expansion member 300. Also, the expansion member 300 may be located at a central portion between the cell assemblies 100, as shown in FIGS. 2 and 3. In this case, there may be an empty space over and under the expansion member 300.

In this configuration, the empty space A2 may ensure a tolerance during assembly and provide a heat insulating space. In particular, the battery cell 110 may generate and release heat not only during thermal runaway but also during normal use. In this case, the empty space in the module case 200 may perform a heat insulating function between the battery cells 110 or between the module case 200 and the cell assembly 100. Also, the empty space A2 may provide a path through which, in an initial emergency situation where venting gas is discharged from the battery cell 110, the venting gas is discharged.

When heat is generated and released from at least some of the battery cells 110 provided in the cell assembly 100 due to a thermal event such as thermal runaway, the heat may be supplied to the expansion member 300. Then, the expansion member 300 may be expanded by the supplied heat, and as shown in FIG. 4, may be changed in shape to fill a part or the whole of the empty space A2 in FIG. 3.

According to this aspect of the present disclosure, because an empty space in the module case 200 is filled, a space through which oxygen may be introduced into the battery module may be removed or reduced. Accordingly, in an emergency situation such as thermal runaway, a fire may be prevented from occurring or spreading in the battery module. Also, even when a flame is generated in the battery module, the flame may be blocked or rapidly extinguished.

The expansion member 300 may be formed in a plate shape, as shown in FIGS. 2 and 3. In particular, at least some of a plurality of expansion members 300 may be formed in a plate shape to face a wide surface of a pouch-type cell. That is, the expansion member 300 may be formed in an erected shape in the vertical direction and at least one of two wide surfaces of the expansion member 300 faces or directly contacts a receiving portion of a pouch-type cell.

Also, the expansion member 300 may include a phase-change material. In particular, the expansion member 300 may include a material whose state such as solid, liquid, or gas changes according to a temperature and whose volume increases as a temperature rises. For example, the phase-change material used in the expansion member 300 may be a material whose state changes from solid to liquid by receiving heat and whose volume increases in this case. Alternatively, the phase-change material may include a material whose state changes from liquid to gas, from solid to gas, or from solid to gel or sol when receiving heat and whose volume increases in this case. The present disclosure is not limited to a specific type of the expansion member 300, for example, a specific type of a phase-change material.

The expansion member 300 may be formed so that a material that is expandable by heat, in particular, a phase-change material, is accommodated in a packaging body. In this case, when thermal runaway occurs in the battery module, the phase-change material in the expansion member 300 may be expanded and may leak out of the packaging body. In this case, the packaging body of the expansion member 300 may be configured to be ruptured by expansion of the phase-change material therein or may have an opening that is pre-formed. In particular, when the opening is pre-formed in the packaging body of the expansion member 300, a stopper may be provided at the opening, and the stopper may be configured to be opened when internal pressure increases to a certain level or higher. Alternatively, the packaging body itself may be configured to be expanded together with the expansion material in the expansion member 300. In this case, the expansion material in the expansion member 300 and the packaging body may be expanded together to fill a space in the module case 200. Alternatively, the expansion member 300 may be formed of only a material that is expandable by heat, for example, only a phase-change material, without a separate packaging body.

The expansion member 300 may include a polyurethane (PU) foam composite member or a porous foam (e.g., Si foam) composite member. Moreover, the expansion member 300 may include a composite member in which expanded polypropylene or liquid hydrocarbon is wrapped in a pellet (capsule)-shaped pouch and coupled to polyurethane foam or porous foam. The pouch-type capsule may be a material such as acrylonitrile co-polymers. Also, in this configuration of the expansion member 300, when heat is applied, the pouch-type capsule and the foam may be expanded. Also, in the configuration, when heat is applied to reach a specific temperature, a foam material may start to be foamed. In this case, a foaming start temperature may be appropriately set according to a structure, type, or shape of a battery module or a secondary battery. For example, the foaming start temperature may be 160° C. or higher. Alternatively, the expansion member 300 may include a porous expansion glass. The porous expansion glass may even perform a fire extinguishing function. However, the present disclosure is not necessarily limited to a specific material, type or shape of the expansion member 300.

Figure 5:
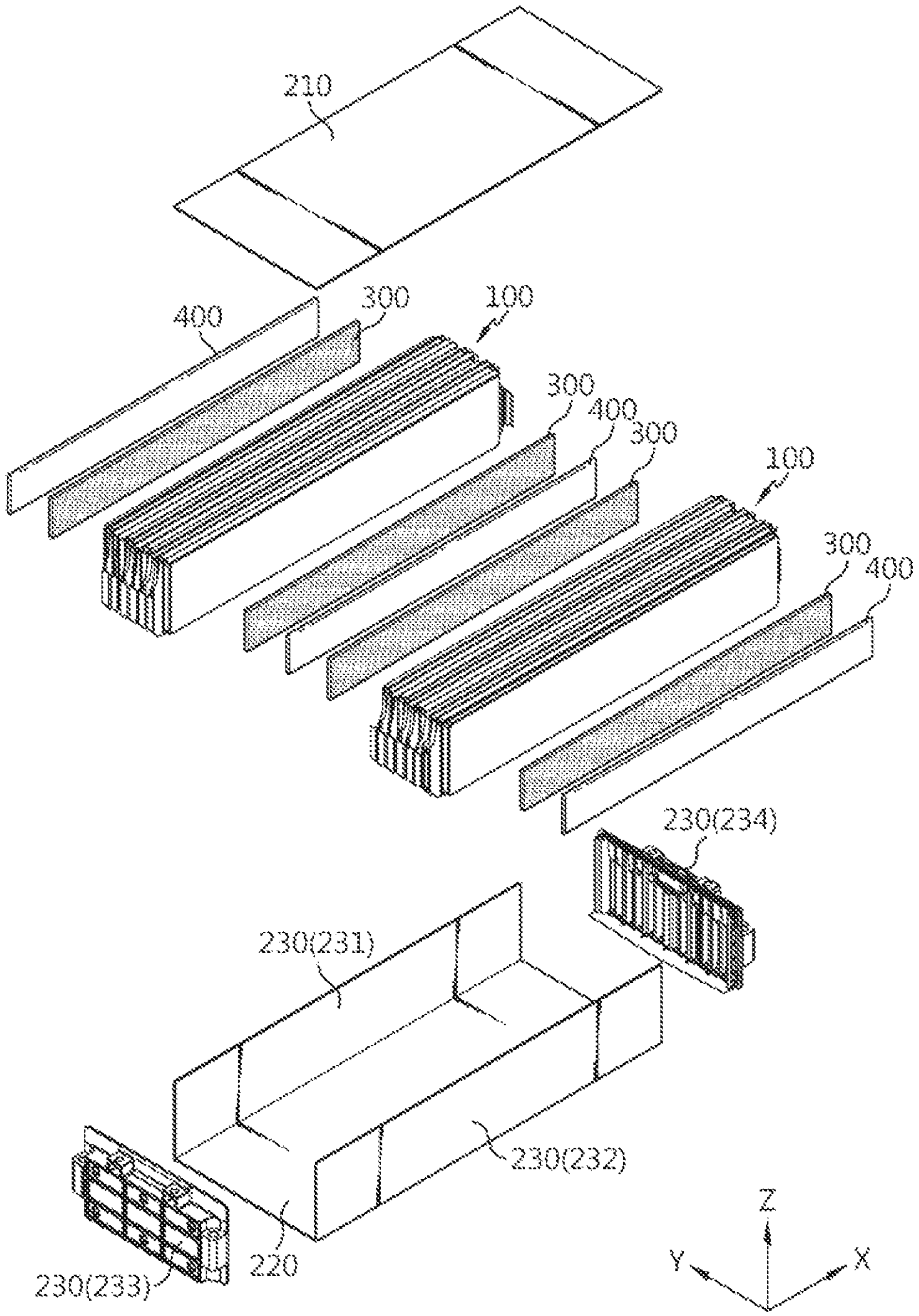
FIG. 5 is an exploded perspective view schematically illustrating elements of a battery module, according to another embodiment of the present disclosure.
Figure 6:
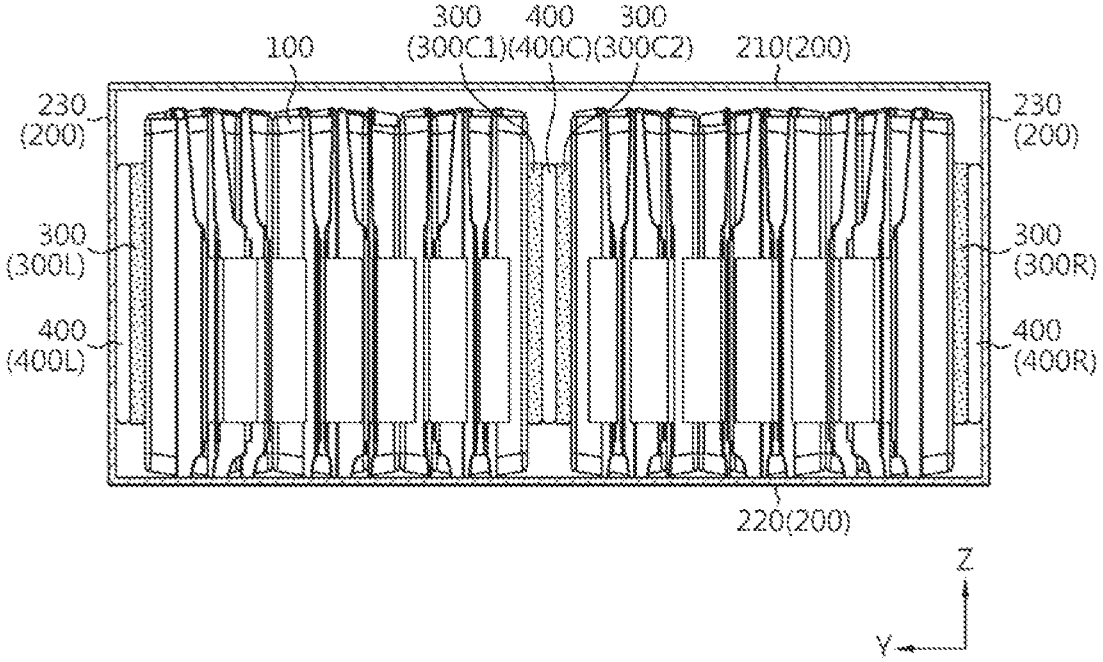
FIG. 6 is a cross-sectional view illustrating the battery module of FIG. 5.

FIG. 5 is an exploded perspective view schematically illustrating elements of a battery module, according to another embodiment of the present disclosure. FIG. 6 is a cross-sectional view illustrating the battery module of FIG. 5. FIG. 6 may be a modification of a configuration of FIG. 4.

When various embodiments of the present specification including the present embodiment are described, for parts to which descriptions of the above embodiments are equally or similarly applicable, descriptions thereof are omitted, and different parts are mainly described in each embodiment.

Referring to FIGS. 5 and 6, a battery module according to the present disclosure may further include a fire extinguishing member 400. The fire extinguishing member 400 may contain a fire extinguishing material. In particular, the fire extinguishing member 400 may include an exterior part in which an inner space is formed and is sealed. In the fire extinguishing member 400, the fire extinguishing material may be accommodated in the inner space of the exterior part. The fire extinguishing material contained in the fire extinguishing member 400 may be any of various materials known at the time of filing the present application. Also, the fire extinguishing material may have a solid state such as a powder state, or various other states or properties such as liquid or gas.

In particular, the fire extinguishing member 400 may be configured to release the fire extinguishing material therein when the expansion member 300 is expanded. Moreover, the fire extinguishing member 400 may be configured to be pressed by expansion pressure when the expansion member 300 is expanded by heat. The fire extinguishing member 400 may be configured to release the fire extinguishing material therein when a pressure of a certain level or more is applied to break the exterior part.

For example, a fire extinguishing agent may be sealed in the fire extinguishing member 400, and the fire extinguishing member 400 may have a substantially sheet shape as shown in FIG. 5. In this case, the fire extinguishing member 400 may be accommodated in the module case 200 so that at least one surface faces the expansion member 300. In particular, when a plurality of expansion members 300 are included, a plurality of fire extinguishing members 400 may be included in the module case 200. One or more fire extinguishing members 400 may face each expansion member 300. In a more specific example, as shown in FIGS. 5 and 6, the expansion members 300 may be located at three points, that is, left, right, and center points, around the cell assembly 100. In particular, the expansion member 300 located at the center may include two expansion members 300C1 and 300C2 that are spaced apart from each other. In this case, a left expansion member 300L and a right expansion member 300R and the central expansion members 300C1 and 300C2 may face and contact surfaces of the fire extinguishing members 400. In particular, a fire extinguishing member 400C located at the center may be located between the two central expansion members 300C1 and 300C2.

According to this embodiment, when thermal runaway occurs in at least one battery cell 110 and heat or flame is ejected, the expansion member 300 may be expanded and thus, the fire extinguishing material may be released from the fire extinguishing member 400 into the module case 200. Then, in the module case 200, the flame may be blocked or a fire may be effectively suppressed due to the fire extinguishing material released from the fire extinguishing member 400.

For example, in an embodiment of FIG. 6, when the left expansion member 300L is expanded, a left fire extinguishing member 400L may be pressed. Also, in the embodiment of FIG. 6, when the right expansion member 300R is expanded, a right fire extinguishing member 400R may be pressed. When the central expansion members 300C1 and 300C2 are expanded, the central fire extinguishing member 400C may be pressed. As such, when the fire extinguishing member 400 is pressed and a pressing force exceeds a certain level, each fire extinguishing member 400 may be damaged to discharge the fire extinguishing material therein.

The fire extinguishing member 400 may include any of various fire extinguishing materials known at the time of filing the present application. For example, the fire extinguishing member 400 may include a fire extinguishing material such as sodium hydrogen carbonate, potassium hydrogen carbonate, or ammonium phosphate. Also, the fire extinguishing member 400 may include a powder fire extinguishing material or a granular fire extinguishing material such as a porous expansion glass.

In the embodiment, the expansion member 300 may be located between the cell assembly 100 and the fire extinguishing member 400. That is, the expansion member 300 may be located closer to the cell assembly 100 than the fire extinguishing member 400. For example, referring to the embodiment of FIG. 6, the left expansion member 300L may be located between the left fire extinguishing member 400L and a left portion of the cell assembly 100. In the embodiment of FIG. 6, the right expansion member 300R may be located between the right fire extinguishing member 400R and a right portion of the cell assembly 100. In this case, the fire extinguishing member 400 may be located farther from the cell assembly 100 than the expansion member 300. Also, the central expansion member 300C1 may be located between the cell assembly 100, in particular, a cell assembly left group, and the central fire extinguishing member 400C. The central expansion member 300C2 may be located between a cell assembly right group and the central fire extinguishing member 400C.

According to the embodiment, when heat generated in the cell assembly 100 is applied to the expansion member 300, the heat may not pass through the fire extinguishing member 400. Accordingly, when heat is generated in the cell assembly 100, the generated heat may be directly transferred to the expansion member 300, and the expansion member 300 may be smoothly expanded by the heat. That is, according to the embodiment, heat of the cell assembly 100 may be well transferred to the expansion member 300 without being disturbed by the fire extinguishing member 400.

Figure 7:
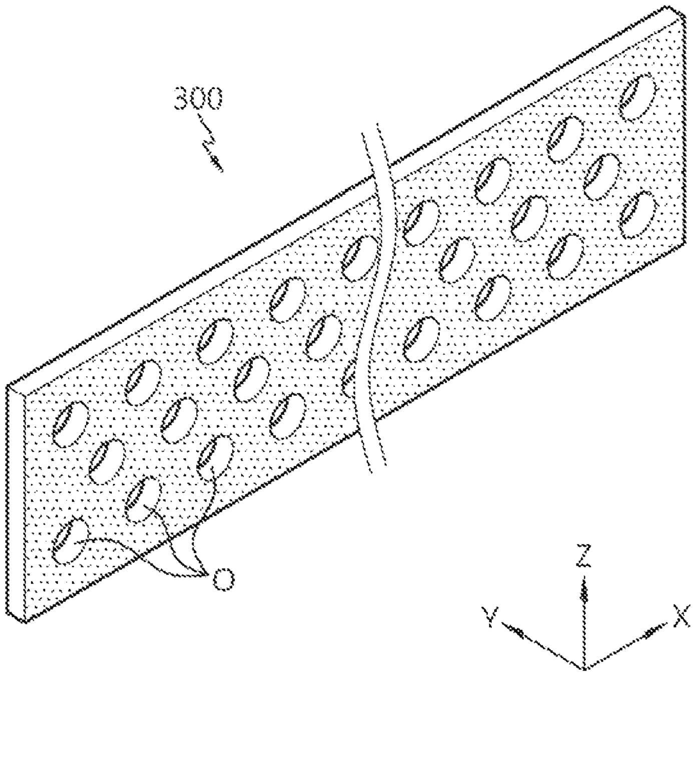
FIG. 7 is a perspective view schematically illustrating elements of an expansion member included in a battery module, according to still another embodiment of the present disclosure.

FIG. 7 is a perspective view schematically illustrating elements of the expansion member 300 included in a battery module, according to still another embodiment of the present disclosure. When the present embodiment is described, different parts from the above embodiments will be mainly described.

Referring to FIG. 7, a through-hole O passing from the inside to the outside may be formed in the expansion member 300. For example, the expansion member 300 of FIG. 7 may be employed as the expansion member 300 of the battery module as shown in FIGS. 5 and 6. In this case, the expansion member 300 may be formed in a sheet shape erected in the vertical direction and may have wide left and right surfaces, and the through-hole O may pass through the expansion member 300 in a left-right direction. In particular, a plurality of through-holes O may be formed in the expansion member 300 to be spaced apart from each other. That is, the plurality of through-holes O may be widely distributed on a surface of the expansion member 300. Moreover, the through-hole O may be formed in a state where the expansion member 300 is expanded. That is, the through-hole O may not be formed in a state where the expansion member 300 is not expanded, but may be formed when the expansion member 300 is expanded. Alternatively, the through-hole O may be formed in advance even when the expansion member 300 is not expanded, and may maintain such a through-state or may increase its size even when the expansion member 300 is expanded.

According to this embodiment of the present disclosure, a fire extinguishing material of the fire extinguishing member 400 may more smoothly contact the cell assembly 100. In particular, as in the embodiment, when the fire extinguishing member 400 releases the fire extinguishing material in a state where the expansion member 300 is located between the fire extinguishing member 400 and the cell assembly 100, the released fire extinguishing material may be introduced into the cell assembly 100 through the through-hole O of the expansion member 300. Accordingly, a fire extinguishing operation of the cell assembly 100 by the fire extinguishing material may be well performed. For example, when the expansion member 300 of FIG. 7 is applied to the embodiment of FIG. 6 and the left fire extinguishing member 400L releases the fire extinguishing material, the fire extinguishing material may be easily provided to a left surface of the cell assembly 100 through the through-hole O of the left expansion member 300L.

Figure 8:
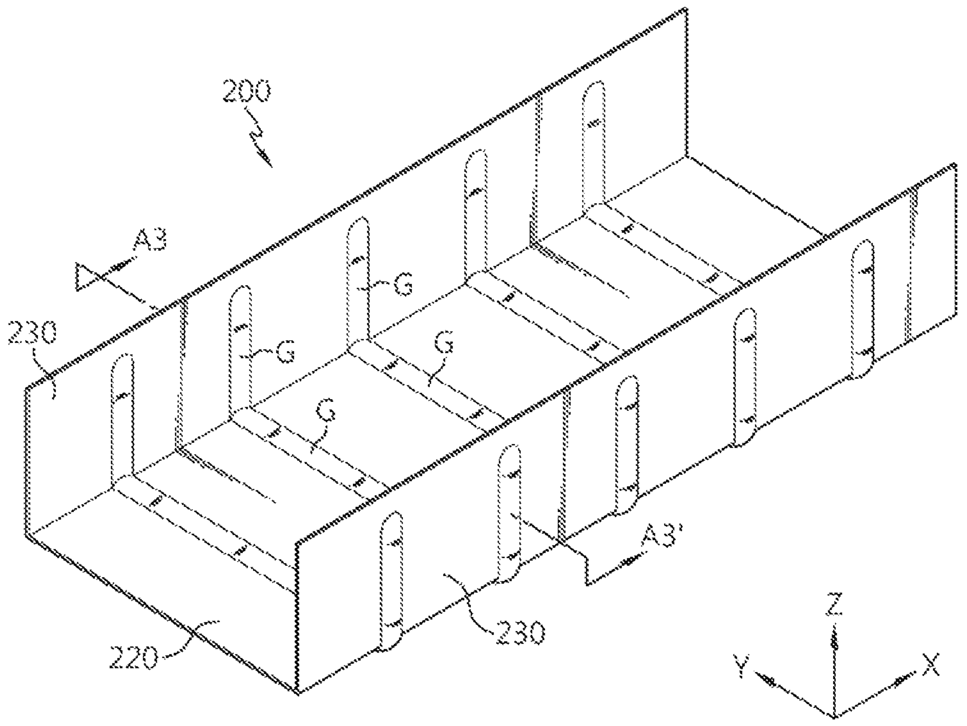
FIG. 8 is a perspective view schematically illustrating elements of a module case included in a battery module, according to still another embodiment of the present disclosure.

FIG. 8 is a perspective view schematically illustrating elements of the module case 200 included in a battery module, according to still another embodiment of the present disclosure. Also, FIG. 9 is a cross-sectional view taken along line A3-A3' of FIG. 8.

Figure 9:
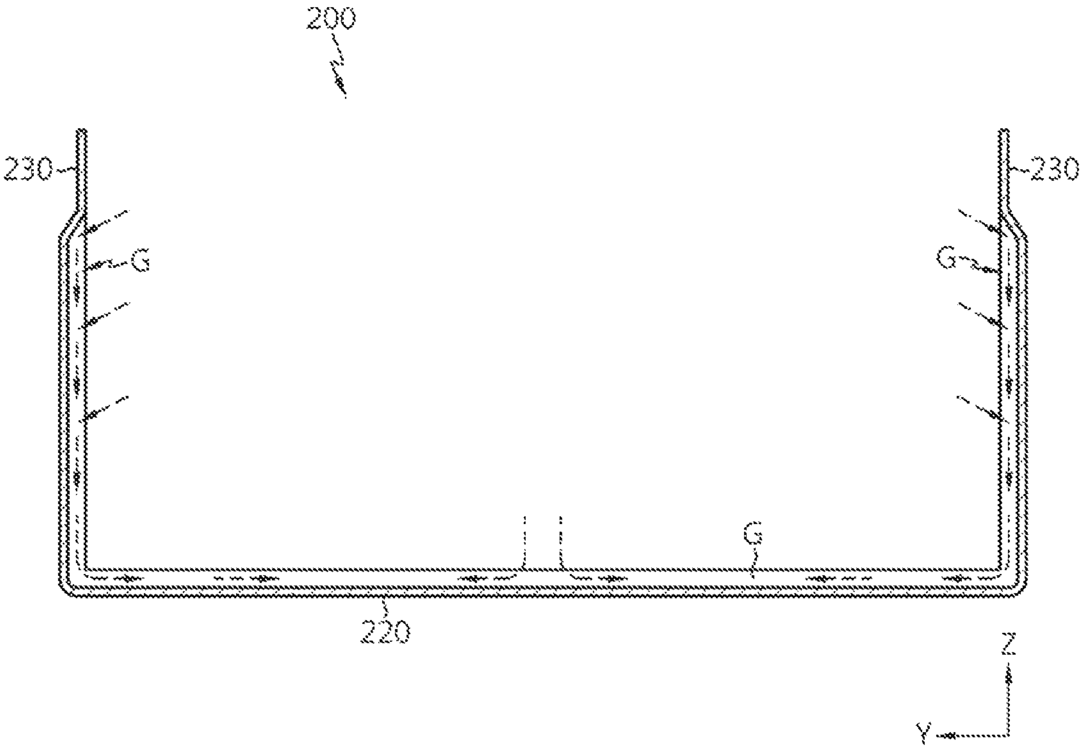
FIG. 9 is a cross-sectional view taken along line A3-A3' of FIG. 8.

Referring to FIGS. 8 and 9, a distribution groove G that is concave outward may be formed in an inner surface of the module case 200. In particular, a plurality of distribution grooves G may be formed in the side plate 230 to be spaced apart from each other by a certain distance in a front-rear direction. Each distribution groove G may extend long in the vertical direction. In particular, the distribution groove G formed in the side plate 230 may extend downward up to the base plate 220.

Also, a plurality of distribution grooves G may be formed in the base plate 220 to be spaced apart from each other in the front-rear direction. In particular, the distribution groove G formed in the base plate 220 may be connected to the distribution groove formed in the side plate 230. The distribution groove G formed in the base plate 220 may extend long in the left-right direction. In this case, a plurality of battery cells 110 may be stacked on a top surface of the base plate 220 in the left-right direction. Accordingly, the distribution groove G of the base plate 220 may extend long in a stacking direction of the battery cells 110. Furthermore, in an embodiment of FIGS. 8 and 9, the distribution groove G of the base plate 220 may extend long in the left-right direction (Y axis direction), and a left end may be connected to the distribution groove G of the left plate 231 and a right end may be connected to the distribution groove G of the right plate 232.

According to this embodiment of the present disclosure, the fire extinguishing material released from the fire extinguishing member 400 may be smoothly supplied to several battery cells 110. For example, referring to FIG. 9, when the fire extinguishing material is released from the fire extinguishing member 400, the fire extinguishing material may flow into the distribution groove G, as marked by a dashed arrow. Accordingly, the fire extinguishing material may be provided not only to the battery cell 110 adjacent to the fire extinguishing member 400 but also to the battery cell 110 far from the fire extinguishing member 400.

Furthermore, as shown in FIGS. 5 and 6, each fire extinguishing member 400 may be located at a certain position among a central portion of the cell assembly 100 or outside the cell assembly 100. Also, because the battery cell 110 contacts the inner surface of the module case 200 or there is a very narrow space between the module case 200 and the battery cell 110, the fire extinguishing material may be difficult to move. However, when the distribution groove G extends long in the stacking direction of the cells as in the embodiment, the fire extinguishing material may move through the distribution groove G. Hence, in a state where the plurality of battery cells 110 are stacked, the fire extinguishing material may be smoothly supplied to all of the stacked battery cells 110, thereby improving fire prevention or suppression performance of the battery module.

Figure 10:
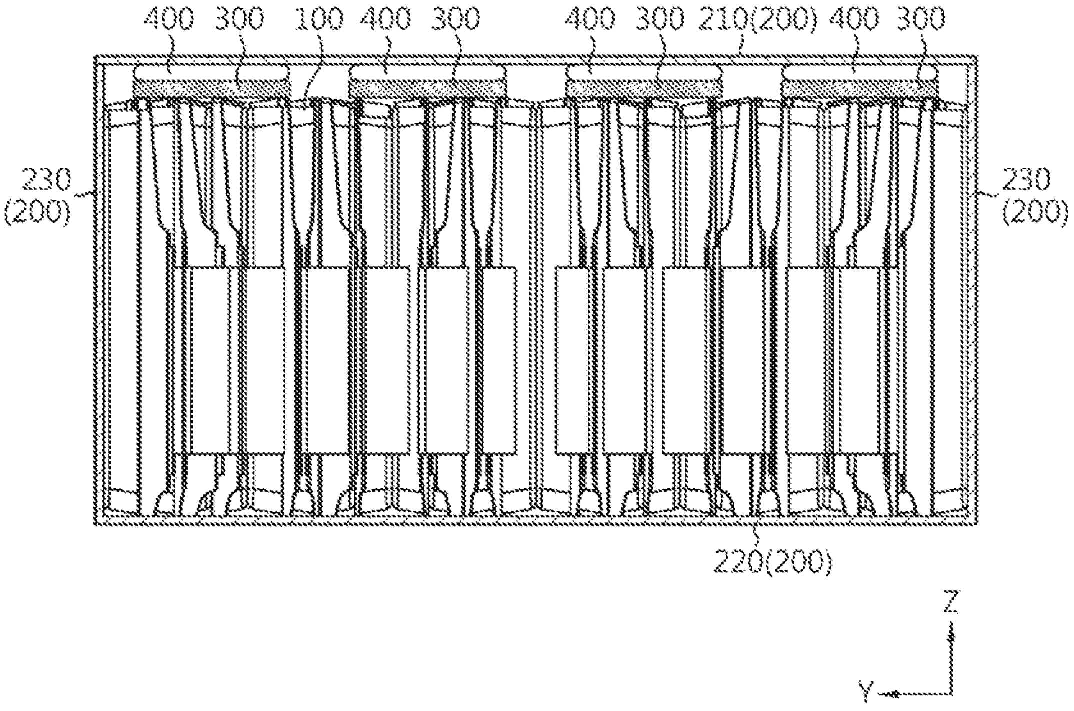
FIG. 10 is a cross-sectional view schematically illustrating elements of a battery module, according to still another embodiment of the present disclosure.

FIG. 10 is a cross-sectional view schematically illustrating elements of a battery module, according to still another embodiment of the present disclosure. In particular, FIG. 10 may be another modification of an embodiment of FIG. 4.

Referring to FIG. 10, the fire extinguishing member 400 may be located over the cell assembly 100. In particular, the fire extinguishing member 400 may be located between the cell assembly 100 and the top plate 210. In this embodiment, when the expansion member 300 is expanded, the fire extinguishing material may be ejected from the fire extinguishing member 400 located over the cell assembly 100. For example, the fire extinguishing member 400 may be located under the top plate 210, and the expansion member 300 may be located under the fire extinguishing member 400. When the expansion member 300 is expanded, the fire extinguishing member 400 may be pressed to discharge the fire extinguishing material therein. The discharged fire extinguishing material may be provided to an upper portion of the cell assembly 100 to prevent ignition or fire of the cell assembly 100.

According to the embodiment, because the fire extinguishing material is supplied from the upper portion of the cell assembly 100, the entire portion of the cell assembly 100 from the upper portion to a lower portion may contact the fire extinguishing material. Accordingly, fire suppression performance and fire extinguishing performance of the cell assembly 100 may be further improved. In particular, in the cell assembly 100, the battery cells 110 may be stacked in the horizontal direction, for example, the left-right direction (Y axis direction), while erected. In this configuration of the cell assembly 100, when the fire extinguishing member 400 is located over the cell assembly 100 as in the above embodiment, the fire extinguishing material may be smoothly provided to all of the battery cells 110.

Also, as shown in FIG. 10, a plurality of expansion members 300 may be provided over the cell assembly 100 to be spaced apart from each other. In particular, when the expansion members 300 are expanded, a separation space of a certain level or more may be secured. In this case, the fire extinguishing material discharged from the fire extinguishing member 400 may be provided to the cell assembly 100 through the separation space between the expansion members 300. According to this embodiment, even when the expansion member 300 is located between the fire extinguishing member 400 and the cell assembly 100, the fire extinguishing material discharged from the fire extinguishing member 400 may be smoothly supplied to the cell assembly 100.

Also, a configuration of the expansion member 300 as shown in FIG. 7 may be applied to the expansion member 300 of FIG. 10. In this case, the fire extinguishing material discharged from the fire extinguishing member 400 may pass through the expansion member 300 through the through-hole O, may move downward, and may be supplied to the cell assembly 100.

Figure 11:
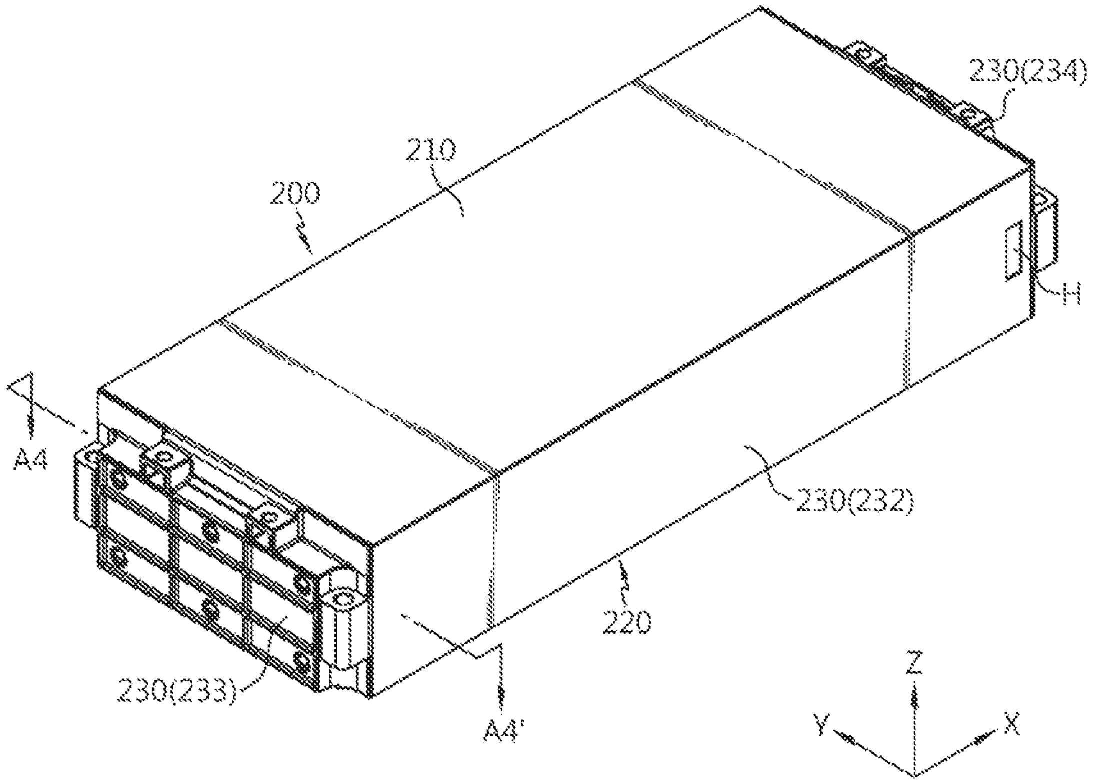
FIG. 11 is a perspective view schematically illustrating elements of a battery module, according to still another embodiment of the present disclosure.
Figure 12:
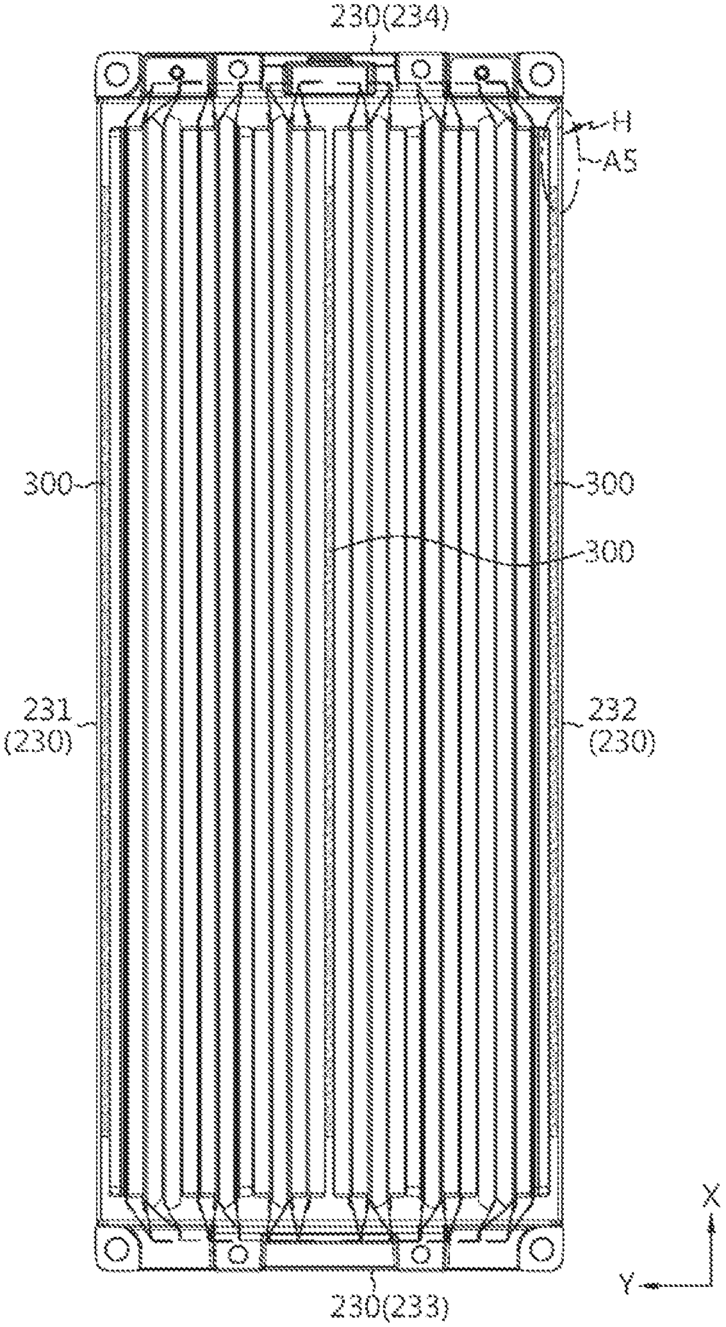
FIG. 12 is a cross-sectional view taken along line A4-A4' of FIG. 11.
Figure 13:
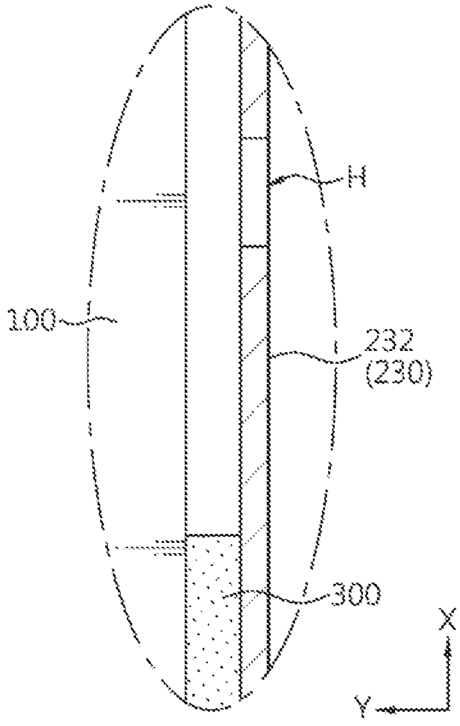
FIG. 13 is an enlarged view illustrating a portion A5 of FIG. 12.
Figure 14:
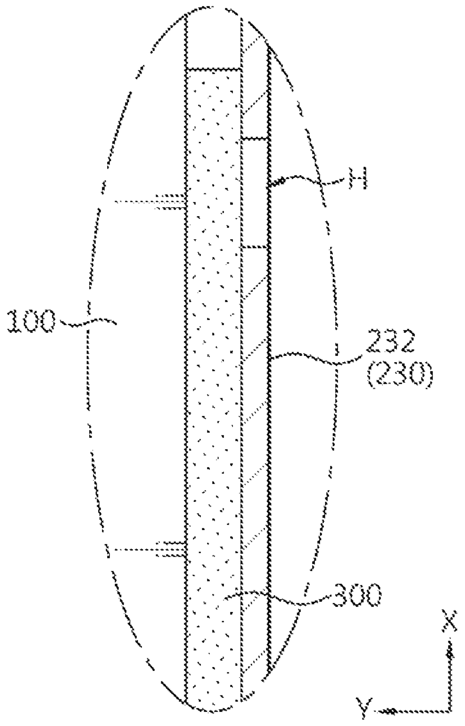
FIG. 14 is a view schematically illustrating a state where an expansion member is expanded, in a configuration of FIG. 13.

FIG. 11 is a perspective view schematically illustrating elements of a battery module, according to still another embodiment of the present disclosure. Also, FIG. 12 is a cross-sectional view taken along line A4-A4' of FIG. 11. FIG. 13 is an enlarged view illustrating a portion A5 of FIG. 12. FIG. 14 is a view schematically illustrating a state where the expansion member 300 is expanded, in a configuration of FIG. 13. Even in the present embodiment, different parts from the above embodiments will be mainly described.

Referring to FIGS. 11 to 14, a venting hole H may be formed in the module case 200. For example, the venting hole H for communicating the inside and the outside of the module case 200 may be formed in the right plate 232 of the module case 200. In this configuration, when venting gas is generated and ejected from the cell assembly 100 accommodated in an inner space of the module case 200, the generated venting gas may be discharged to the outside through the venting hole H.

In this embodiment, the expansion member 300 may be configured to close at least a part of the venting hole H when expanded. For example, as shown in FIG. 14, the expansion member 300 may fill the inner space of the module case 200 while being expanded by heat, and in this case, the expanded expansion member 300 may close a part or the whole of the venting hole H. In particular, the expansion member 300 may be configured to close the venting hole H by receiving heat and being expanded when venting gas is discharged to the outside through the venting hole H. A configuration for closing the venting hole H by the expansion member 300 may be appropriately designed by considering various situations such as a size of the expansion member 300, a distance to the venting hole H, a temperature increased when venting gas is discharged, and the inner space of the module case 200.

According to this embodiment of the present disclosure, external air, in particular, oxygen, may be effectively prevented from being introduced into the module case 200 through the venting hole H. When venting gas is generated in the module case 200, the venting gas may be discharged to the outside through the venting hole H. However, after the venting gas is discharged, oxygen may be introduced into the module case 200 through the venting hole H. However, according to the embodiment, because the venting hole H may be closed by the expansion member 300 after venting gas is discharged, introduction of oxygen through the venting hole H may be prevented. Hence, in this case, exhaust performance through the venting hole H may be ensured, and a fire may be prevented from occurring or spreading through the venting hole H as much as possible.

Figure 15:
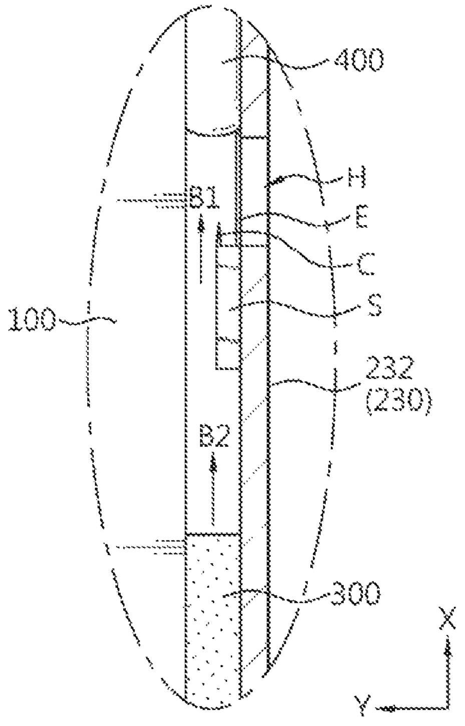
FIG. 15 is an enlarged view schematically illustrating some elements of a battery module, according to still another embodiment of the present disclosure.

FIG. 15 is an enlarged view schematically illustrating some elements of a battery module, according to still another embodiment of the present disclosure. In particular, FIG. 15 may be a modification of a configuration of FIG. 13.

Referring to FIG. 15, the module case 200 may include a sliding portion S around the venting hole H. The sliding portion S may be movable as marked by an arrow B1. In particular, in a normal state, the sliding portion S may be located to open the venting hole H without closing the venting hole H. However, when the expansion member 300 is expanded as marked by an arrow B2 due to thermal runaway occurring in the battery module, the sliding portion S may slide in a direction marked by the arrow B1 due to the expansion of the expansion member 300. A part or the whole of the venting hole H may be closed due to the sliding of the sliding portion S. Furthermore, in this embodiment, in order for the sliding portion S to smoothly close the venting hole H, a guide rail E may be provided on the module case 200 as shown in FIG. 15. The guide rail E for guiding a sliding direction or a movement distance of the sliding portion S may help the sliding portion S to well close the venting hole H when the expansion member 300 is expanded.

According to this embodiment, a configuration for closing the venting hole H by the expansion of the expansion member 300 may be more easily implemented. Accordingly, in an emergency situation such as thermal runaway, introduction of oxygen through the venting hole H may be more reliably prevented. Also, in the embodiment, a material resistant to a flame or high temperature may be used for the sliding portion S. Accordingly, even when a flame or the like is generated in the battery module, the flame may be reliably prevented from leaking out to the outside through the venting hole H.

As described in the above embodiment, the fire extinguishing member 400 may be included in the battery module according to the present disclosure. Although the expansion member 300 directly presses the fire extinguishing member 400 to discharge a fire extinguishing material of the fire extinguishing member 400 in the above description, the present disclosure is not necessarily limited to this embodiment. For example, the fire extinguishing member 400 may be damaged by an element such as a sharp needle-shaped body when the expansion member 300 is expanded to discharge the fire extinguishing material therein.

In particular, as shown in FIG. 15, when the sliding portion S is provided in the module case 200, the fire extinguishing member 400 may be damaged by movement of the sliding portion S to eject the fire extinguishing material therein. In a more specific example, as shown in FIG. 15, the sliding portion S may move in a direction marked by the arrow B1, that is, toward the rear of the battery module, due to expansion of the expansion member 300. In this case, the fire extinguishing member 400 may be provided behind the sliding portion S. A needle-shaped protrusion C may be formed at a rear end of the sliding portion S, that is, an end toward the fire extinguishing member 400.

In this configuration, when the sliding portion S moves in the direction marked by the arrow B1, that is, rearward, due to expansion of the expansion member 300, the venting hole H may be closed. While the venting hole H is closed, the fire extinguishing member 400 may be ruptured due to the needle-shaped protrusion C provided at the rear end of the sliding portion S. Then, the fire extinguishing material may be ejected into the module case 200 through a ruptured portion of the fire extinguishing member 400.

In particular, in the embodiment, the sliding portion S may be configured to rupture the fire extinguishing member 410 after the venting hole H is closed. To this end, a position of the fire extinguishing member 400 or a shape or a size of the needle-shaped protrusion C may be set so that the sliding portion S contacts the fire extinguishing member 400 after the sliding portion S closes the venting hole H.

According to this embodiment of the present disclosure, because the fire extinguishing material is ejected into the module case 200 after the module case 200 is closed, a fire extinguishing effect by the fire extinguishing material may be further improved. That is, because the fire extinguishing material is ejected in a state where the inside of the module case 200 is sealed by the sliding portion S, the fire extinguishing material may not be discharged to the outside through the venting hole H and may mainly exist only in the module case. Accordingly, in this case, an effect of suppressing a fire by the fire extinguishing material may be increased.

Figure 16:
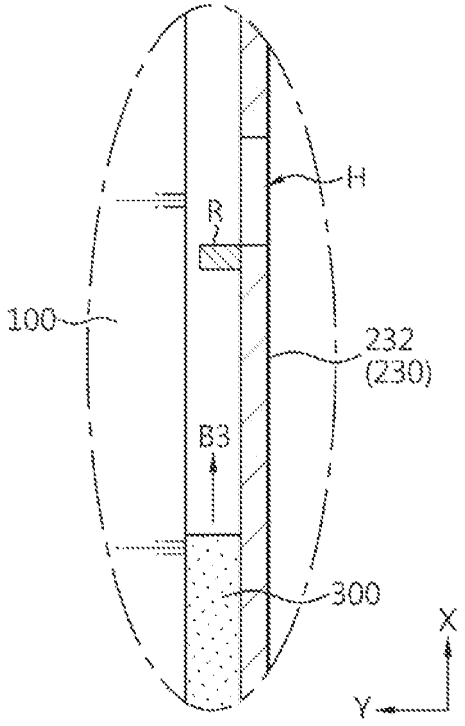
FIG. 16 is an enlarged view schematically illustrating some elements of a battery module, according to still another embodiment of the present disclosure.

FIG. 16 is an enlarged view schematically illustrating some elements of a battery module, according to still another embodiment of the present disclosure. In particular, FIG. 16 may be still another modification of a configuration of FIG. 13.

Referring to FIG. 16, a blocking portion R may be formed on an inner surface of the module case 200 to protrude toward the cell assembly 100. For example, in FIG. 16, the blocking portion R may be formed on an inner surface of the right plate 232 to protrude toward the cell assembly 100, that is, leftward. In particular, the blocking portion R may be located between the expansion member 300 and the venting hole H. Furthermore, the blocking portion R may be provided around the venting hole H.

According to this embodiment of the present disclosure, when venting gas is generated in the battery module, the venting gas may be easily discharged through the venting hole H formed in the module case 200 and leakage of the expansion member 300 may be prevented. In particular, when the expansion member 300 is changed into a fluid state such as liquid, gas, or gel while being expanded by receiving heat, the expansion member 300 may leak out to the outside of the module case 200. However, in the embodiment, the blocking portion R may prevent leakage of the expansion member 300. For example, in a configuration of FIG. 16, when the expansion member 300 is expanded in a direction B3 by heat, the expansion member 300 may be suppressed from leaking out through the venting hole H due to the blocking portion R provided around the venting hole H. Hence, an effect of filling the expansion member 300 in the module case 200 may be more reliably achieved.

A degree of expansion of the expansion member 300 may be partially different. In particular, for this configuration, the expansion member 300 may include a plurality of expansion portions, which will be described in more detail with reference to FIGS. 17 and 18.

Figure 17:
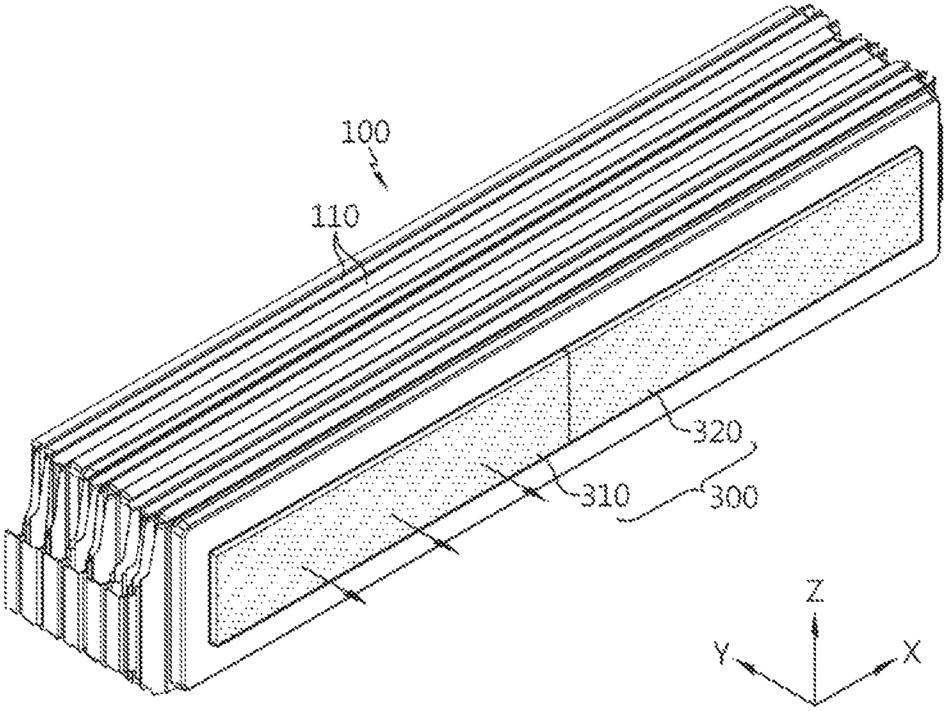
FIG. 17 is a perspective view schematically illustrating some elements of a battery module, according to still another embodiment of the present disclosure.
Figure 18:
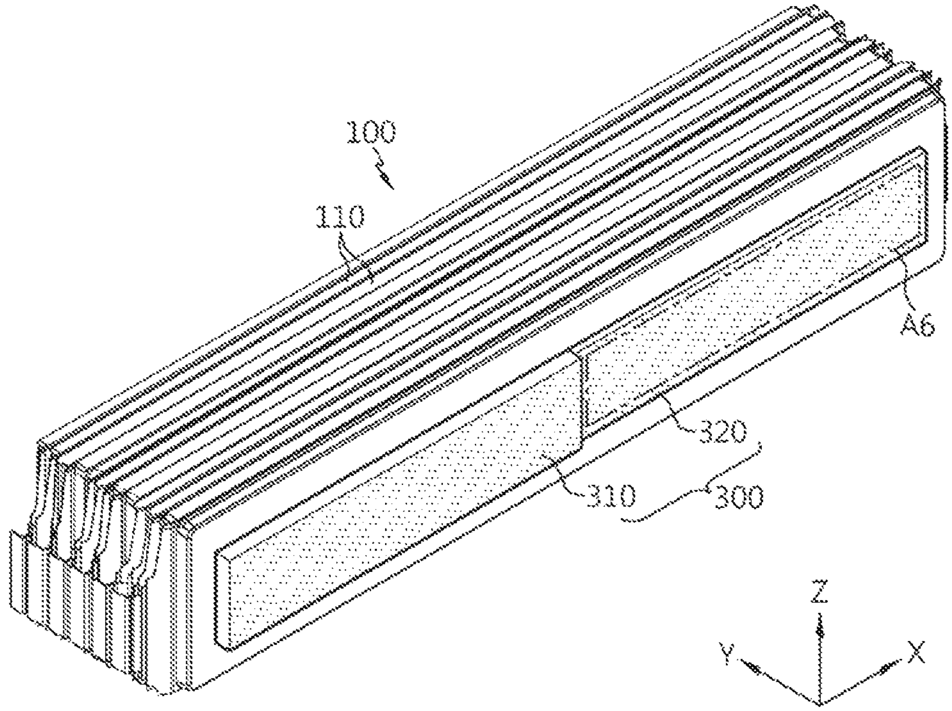
FIG. 18 is a view schematically illustrating a state where a part of an expansion member is expanded, in a configuration of the battery module of FIG. 17.

FIG. 17 is a perspective view schematically illustrating some elements of a battery module, according to still another embodiment of the present disclosure. FIG. 18 is a view schematically illustrating a state where a part of the expansion member 300 is expanded, in a configuration of the battery module of FIG. 17.

Referring to FIGS. 17 and 18, a surface, for example, a left surface, of the expansion member 300 may contact the cell assembly 100. Although not shown, a right surface of the expansion member 300 may face an inner surface of the module case 200. In this configuration, when heat is generated in the cell assembly 100 and the expansion member 300 is heated, a front end portion of the expansion member 300 may be first expanded. That is, when the expansion member 300 is heated and first reaches a certain temperature, the front end portion of the expansion member 300 may be expanded as marked by an arrow in FIG. 17. A rear end portion of the expansion member 300 may not be expanded yet or may have a smaller degree of expansion than the front end portion. In this case, the expansion member 300 may be partially expanded as shown in FIG. 18.

According to this configuration of the present disclosure, an effect of discharging venting gas from the inside of the module case 200 to the outside may be further improved. For example, when only the front end portion of the expansion member 300 is expanded and the rear end portion is not expanded yet as shown in FIG. 18, there may be an empty space A6 on a right surface of a rear side of the expansion member 300. Accordingly, in this state, venting gas in the module case 200 may be guided to the space A6. The venting gas gathered in the space A6 may be discharged to the outside of the module case 200.

Furthermore, as shown in FIG. 11, when the venting hole H is formed in the module case 200, the expansion member 300 may be formed so that the empty space A6 is located close to the venting hole H. That is, as a temperature of the expansion member 300 increases, a portion of the expansion member 300 far from the venting hole H may be first expanded, and a portion of the expansion member 300 close to the venting hole H may be expanded later.

According to this embodiment, venting gas in the module case 200 may be guided toward the space A6 where the expansion member 300 is not expanded yet, and the venting gas may be discharged to the outside through the venting hole H. Accordingly, according to the embodiment, when there is venting gas in the module case 200, the venting gas may be smoothly discharged to the outside of the module case 200 when the expansion member 300 is expanded.

In particular, the expansion member 300 may include a plurality of expansion portions having different reaction temperatures for expansion. For example, the expansion member 300 may include a first expansion portion 310 and a second expansion portion 320, as shown in FIGS. 17 and 18. In this case, the first expansion portion 310 and the second expansion portion 320 may be formed in a sheet shape and may be located so that edge portions contact each other on one plane.

Moreover, the first expansion portion 310 and the second expansion portion 320 may have different degrees of expansion according to temperature. In particular, the first expansion portion 310 may have a maximum degree of expansion at a temperature T1, and the second expansion portion 320 may have a maximum degree of expansion at a temperature T2 that is different from the temperature T1. A difference in a degree of expansion between the first expansion portion 310 and the second expansion portion 320 may be caused by a difference in a material or a shape of each expansion portion.

Furthermore, in an embodiment of FIGS. 17 and 18, when the venting hole H is located close to the second expansion portion 320, the maximum expansion temperature T2 of the second expansion portion 320 may be higher than the maximum expansion temperature T1 of the first expansion portion 310. Accordingly, when heated to a certain temperature, for example, T1, the expansion member 300 may be partially expanded as shown in FIG. 18, and thus, venting gas may move toward the venting hole H. Hence, the venting gas may be more easily discharged.

Also, when an internal temperature of the battery module further increases to reach a higher temperature, for example, T2, the second expansion portion 320 may also be expanded, and the empty space A6 may be filled by the second expansion portion 320. Accordingly, an empty space in an inner space of the module case 200 may be further reduced, and in particular, the venting hole H may be closed. Accordingly, the risk of oxygen introduced into the module case 200 may be further reduced.

A battery pack according to an aspect of the present disclosure may include one or more battery modules according to the present disclosure. Also, the battery pack according to the present disclosure may further include various elements such as a battery management system (BMS) in addition to the battery modules. The BMS may be mounted in an inner space of a battery pack and may control an overall operation such as a charging/discharging operation or a data transmitting/receiving operation of a cell assembly. The BMS may be provided in units of packs, instead of units of modules. In more detail, the BMS may be configured to control or predict a charge/discharge state, a power state, and a performance state of the cell assembly through a pack voltage and pack current. The BMS is known at the time of filing the present application, and thus, a detailed description thereof will be omitted. Also, the battery pack according to the present disclosure may further include various elements of a battery pack known at the time of filing the present application such as a bus bar, a pack case, a relay, and a current sensor.

The battery pack according to another aspect of the present disclosure may not include the module case 200, which will be described with reference to FIG. 19.

Figure 19:
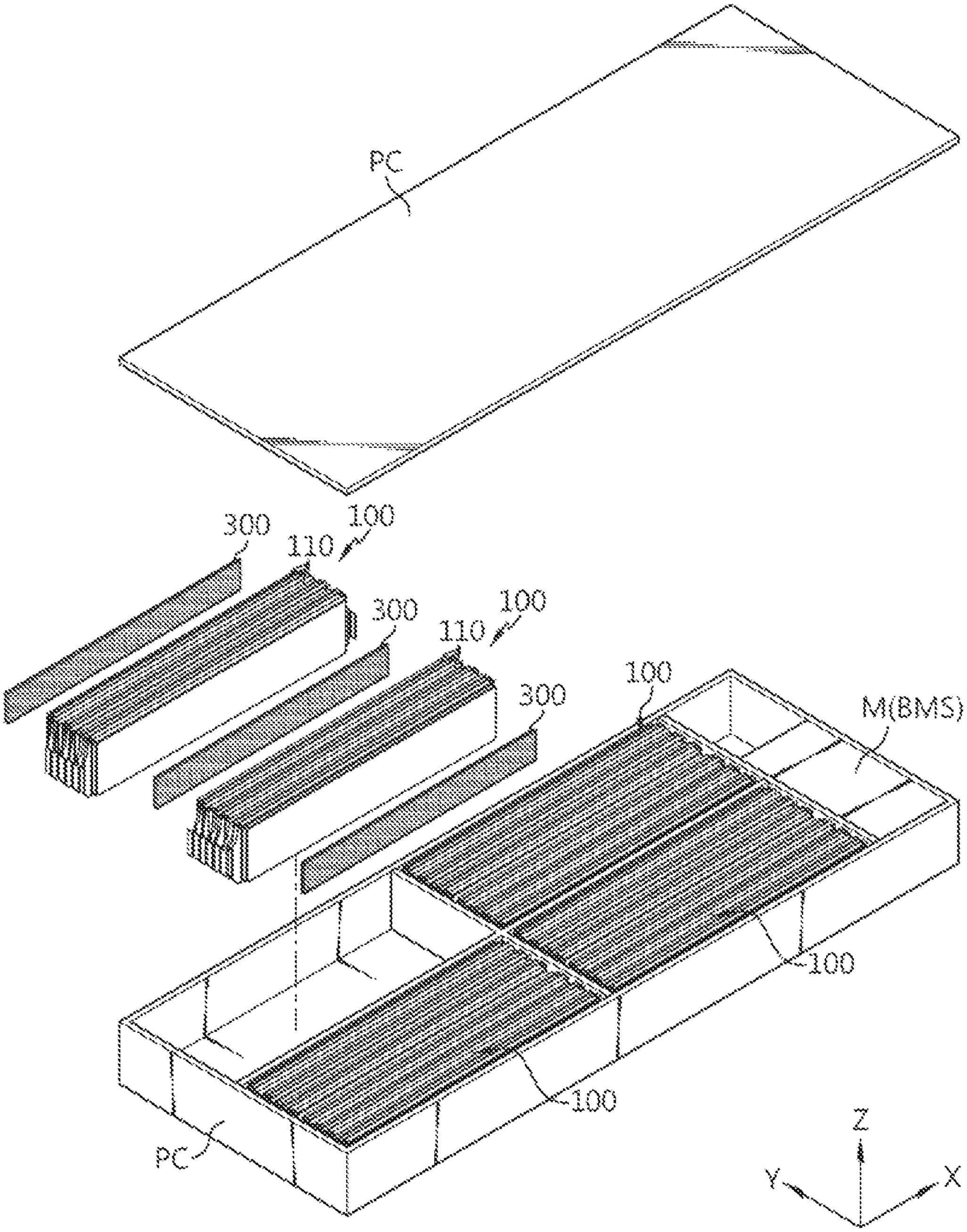
FIG. 19 is a perspective view schematically illustrating elements of a battery pack, according to another embodiment of the present disclosure.

FIG. 19 is a perspective view schematically illustrating elements of a battery pack, according to another embodiment of the present disclosure.

Referring to FIG. 19, the battery pack according to the present disclosure may include the cell assembly 100, a pack case PC, and the expansion member 300. In this case, the cell assembly 100 and the expansion member 300 may be directly accommodated in an inner space of the pack case PC, without being accommodated in an inner space of the module case 200. In this embodiment, a plurality of battery cells 110 may not be modularized, but may be directly mounted on the pack case PC in a cell-to-pack manner. In the inner space of the pack case PC, a BMS M or other electronic components may be accommodated in addition to the cell assembly 100.

In the battery pack, there is a difference only in that the cell assembly 100, the expansion member 300, and the fire extinguishing member 400 are mounted in the pack case PC, instead of the module case 200, and descriptions of other parts may be equally or similarly applied. For example, most of descriptions made with reference to FIGS. 3 to 18 may be applied, except that the module case 200 is replaced with the pack case PC.

For example, although not shown in FIG. 19, the fire extinguishing member 400 described with reference to FIGS. 5 and 6 may be accommodated in the pack case PC. In another example, a configuration related to the distribution groove G formed in the module case 200 described with reference to FIGS. 8 and 9 may be formed in the pack case PC. In another example, a configuration related to the venting hole H formed in the module case 200 described with reference to FIGS. 11 to 14 may applied to the pack case PC. Accordingly, a more detailed description of the battery pack of various aspects will be omitted.

The battery module or the battery pack according to the present disclosure may be applied to a vehicle such as an electric vehicle or a hybrid vehicle. That is, a vehicle according to the present disclosure may include the battery module according to the present disclosure or the battery pack according to the present disclosure. Also, the vehicle according to the present disclosure may include various other elements included in a vehicle in addition to the battery module or the battery pack. For example, the vehicle according to the present disclosure may further include a vehicle body, a motor, and a control device such as an electronic control unit (ECU) in addition to the battery module according to the present disclosure.

Also, the battery module or the battery pack according to the present disclosure may be applied to an energy storage system (ESS). That is, an ESS according to the present disclosure may include the battery module according to the present disclosure or the battery pack according to the present disclosure.

It will be understood by one of ordinary skill in the art that when terms indicating directions such as upper, lower, left, right, front, and rear are used, these terms are only for convenience of explanation and may vary according to a position of a target object, a position of an observer, etc.

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

DESCRIPTION OF REFERENCE NUMERALS

100: cell assembly
110: battery cell
200: module case
210: top plate, 220: base plate, 230: side plate
231: left plate, 232: right plate, 233: front plate, 234: rear plate
300: expansion member
310: first expansion portion, 320: second expansion portion
400: fire extinguishing member
O: through-hole
G: distribution groove
S: sliding portion
E: guide rail
C: needle-shaped protrusion
R: blocking portion
PC: pack case
M: BMS

What is claimed is:

1. A battery module comprising:
a cell assembly comprising one or more battery cells;
a module case having an inner space in which the cell assembly is accommodated;
at least one expansion member located in the module case, and configured to fill at least a part of an empty space in the module case by being expanded in volume when heat is supplied as a result of a thermal event in the battery module; and
a fire extinguishing member containing a fire extinguishing material, and configured to release the fire extinguishing material therein when the at least one expansion member is expanded.

2. The battery module according to claim 1, wherein the at least one expansion member comprises a phase-change material.

3. The battery module according to claim 1, wherein the at least one expansion member is located between the cell assembly and the fire extinguishing member.

4. The battery module according to claim 1, wherein the fire extinguishing member is located over the cell assembly.

5. The battery module according to claim 1, wherein a venting hole is formed in the module case, and
wherein the at least one expansion member is configured to close at least a part of the venting hole when being expanded.

6. The battery module according to claim 1, wherein the at least one expansion member comprises a plurality of expansion portions, and
wherein a degree of expansion of the plurality of expansion portions of the expansion member is partially different.

7. The battery module according to claim 6, wherein the plurality of expansion portions have different reaction temperatures for expansion.

8. The battery module according to claim 1, wherein the at least one expansion member has apertures.

9. The battery module according to claim 1, wherein the cell assembly comprises two groups of battery cells, and
wherein the at least one expansion member is between the two groups of battery cells.

10. The battery module according to claim 9, wherein the at least one expansion member is a first expansion member and a second expansion member, and
wherein the fire extinguishing member containing the fire extinguishing material is between the first expansion member and the second expansion member.

11. The battery module according to claim 9, wherein the at least one expansion member is a first expansion member between the cell assembly and a first wall of the module case, a second expansion member between the cell assembly and a second wall of the module case and a third expansion member between the two groups of battery cells.

12. The battery module according to claim 1, wherein the one or more battery cells are stacked in a first direction of the module case, and
wherein concave grooves are formed across a bottom wall of the module case in the first direction.

13. A battery pack comprising the battery module according to claim 1.

14. A battery pack comprising:
a cell assembly comprising one or more battery cells;
a pack case having an inner space in which the cell assembly is accommodated;
an expansion member located in the pack case, and configured to fill at least a part of an empty space in the pack case by being expanded in volume when heat is supplied as a result of a thermal event in the battery pack; and
a fire extinguishing member containing a fire extinguishing material, and configured to release the fire extinguishing material therein when the expansion member is expanded.

15. A vehicle comprising the battery module according to claim 1.

16. A vehicle comprising the battery pack according to claim 14.

* * * * *